UNITED STATES PATENT OFFICE.

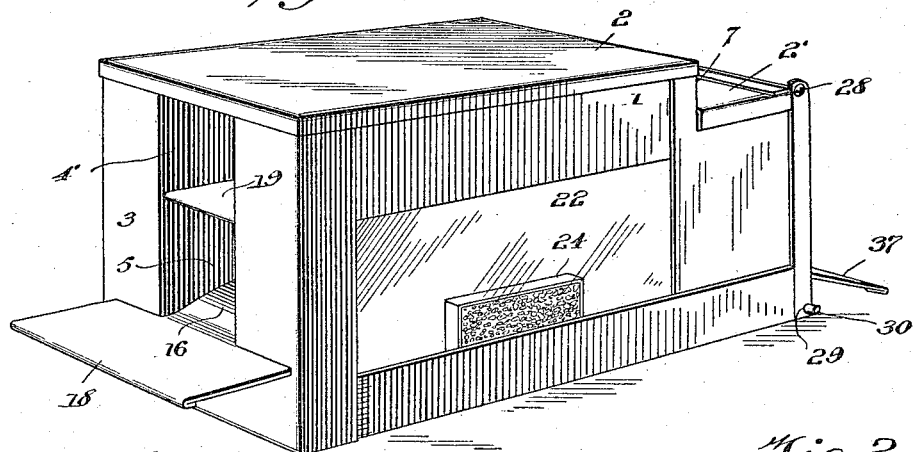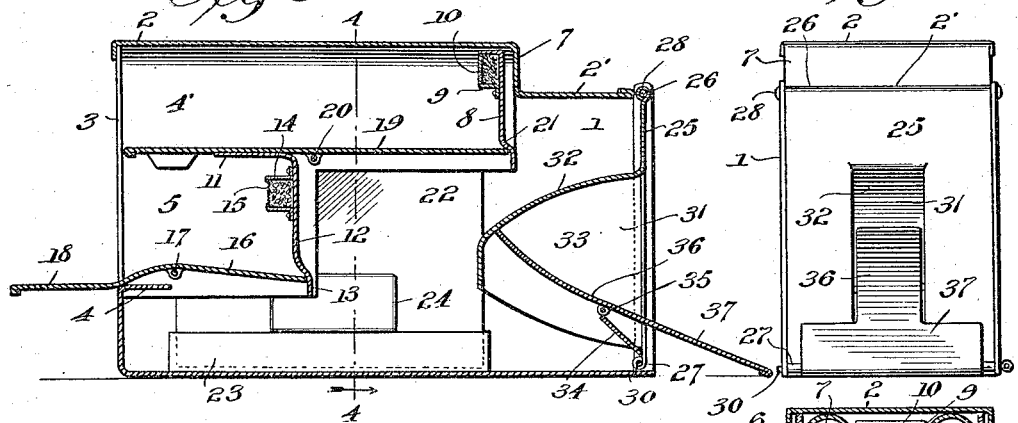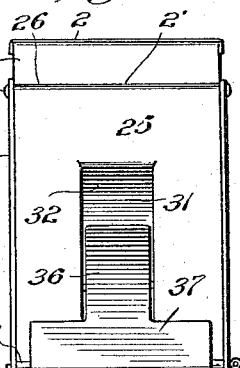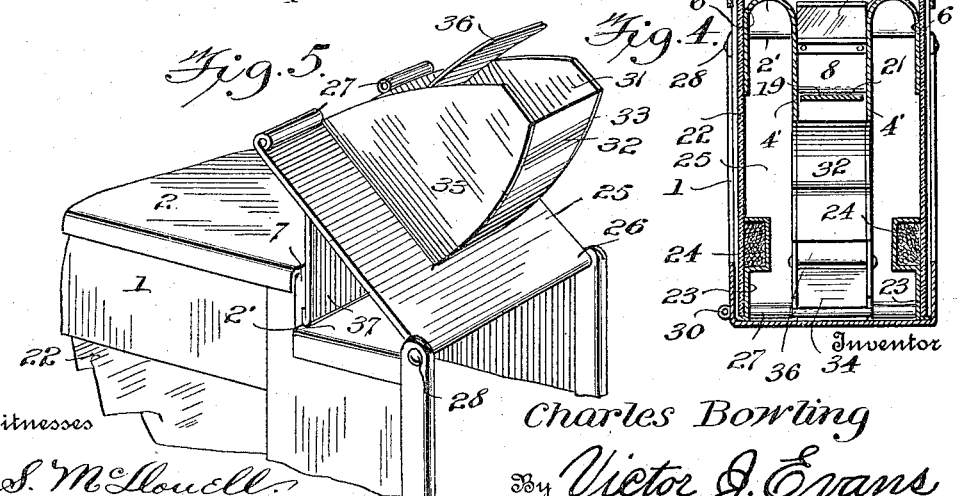

CHARLES BOWLING, OF BUFFALO, NEW YORK.

ANIMAL-TRAP.

1,151,438. Specification of Letters Patent. Patented Aug. 24, 1915.

Application filed January 23, 1914. Serial No. 813,974.

*To all whom it may concern:*

Be it known that I, CHARLES BOWLING, a citizen of the United States, residing at Buffalo, in the county of Erie and State of New York, have invented new and useful Improvements in Animal-Traps, of which the following is a specification.

The present invention relates to animal traps.

In carrying out my invention it is my purpose to simplify and improve the existing art by constructing a trap primarily adapted for ensnaring small animals, such as rodents; that will be provided with a bait that is visible to the animal but which is arranged out of contact by the animal; the said trap having both of its ends provided with doors, all of which being pivoted to permit of the entrance of an animal to the trap and which will close automatically after the animal enters the trap to imprison the animal within the trap and the said doors being so arranged as to prevent the escape of one animal out of the trap when a second animal enters the trap.

A further object of the invention is to provide a substantially rectangular trap having its ends provided with wall passages and bait boxes secured to the inner transverse wall of one of the passages, both of the passages being provided with a tiltable floor, the outer end of which being weighted by a platform so that the inner edge of said floors will be automatically swung into contact with the inner wall of the passages, to close the said passages.

Another object of the invention is to provide a trap having transparent sides upon which are positioned bait boxes, the bait being visible from the exterior of the trap, and whereby an entrapped animal as well as the bait will serve as a snare for enticing other animals within the trap.

A further object of the invention is to provide a substantially rectangular trap having transparent sides and its ends provided with doors which close automatically, one of the said ends being pivotally secured to the trap and being provided with detachable wings whereby the same may be locked upon the trap, the said end providing means whereby ensnared animals may be delivered from the trap.

A still further object of the invention is to provide a trap of this character with bait boxes having bait therein which is not accessible to the animal either when in the act of entering or when ensnared within the trap, the said bait being so arranged within the boxes as to permit of the aroma of the same being diffused through the boxes, and also whereby the bait may be used an indefinite period without danger of the same becoming decayed.

In the drawings, Figure 1 is a perspective view of a trap constructed in accordance with the present invention, Fig. 2 is a rear elevation of the same, Fig. 3 is a central longitudinal sectional view of the same, Fig. 4 is a transverse sectional view on the line 4—4 of Fig. 3, and Fig. 5 is a detail perspective view looking toward one end of the trap and illustrating the end raised over the top of the trap to permit of the removal of the captured animals from the trap.

As shown in the drawings, the trap comprises a substantially rectangular body or casing, preferably constructed of some inexpensive metal, such as tin. The casing 1 has its top 2, adjacent one of its ends, preferably stepped to provide a reduced portion 2, the end of which being entirely open. The opposite closed end, which may be designated by the numeral 3, is slitted from its top vertically at two points, each an equal distance from its corners, or from the sides of the trap, the slits terminating almost at equal points above the lower edge of the end 3, and the metal between the slits is bent inwardly to provide a floor or shelf 4, and the inner edges of the end provided by the opening thus formed have secured thereto longitudinally extending walls 4' providing this end of the trap with a passage 5. The walls extend to and may be connected with the top of the trap, the same being bent beneath the trap and continued in a horizontal plane to points adjacent the sides 2 of the trap, and from thence bent downwardly in a plane with that of the sides 2. These vertically straight bent portions provide the upper longitudinal edges of the trap with flanges 6, and the walls 4' as well as the flanges 6 extend the longitudinal length of the trap between the end 3 and the wall or shoulder 7 which provides the riser of the stepped portion of the top, and the said walls and their flanges are preferably secured to the inner face of said riser 7. The walls 4 are connected at their inner ends through the medium of a suitable plate 8, and arranged upon the upper portion of said plate, or to the inner face of the riser 7 is a bait box 9, the same being provided with a glass or other transparent closure 10, and arranged within the said box is a bait, preferably of grain. The passage 5, at a suitable distance beyond the end 3 is provided with a horizontally disposed, approximately centrally arranged floor 11 which is connected with the walls 4, and which has its rear end bent downwardly, as at 12, and its extremity curved inwardly and downwardly to provide a lip 13. The vertical portion 12 of the wall 11 has secured thereto a bait box 14, the said box being provided with a transparent closure 15, and the bait within the box is preferably of grain, or the same may be of other material which will entice the animals to be trapped, but the bait should be of some substance which will not readily rot or become decomposed, as the bait is adapted to last the life of the trap. If desired, however, the transparent faces or closures of the bait boxes 9 and 14 may be, and preferably are, removable so that should occasion arise wherein a bait of a different material is desired, the same may be placed within the boxes. The closures 10 and 15, while rendering the bait visible, and while also serving to protect and preserve the bait, do not render the boxes hermetically sealed, as it is desired that the aroma of the bait be scented by the animals.

Arranged above the horizontally-disposed wall or ledge 4' is a floor 16, the same being pivotally secured between the walls 4', as at 17, and the inner edge of the said platform is adapted to abut with the lip 13 of the partition 12. The outer portion of the floor 16 is provided with a platform 18, the same being of a width approximately equaling the width of the trap, and adding to the weight of the floor 16, retains the inner end of the said floor in engagement with the lip 13, as will be readily understood. The wall or ledge 4 is arranged between the platform 18 and the pivot 17, so that the same will not interfere with the tilting of the floor when an animal, attracted by the bait within the box 14, walks upon the said floor, the weight of the animal being sufficient to swing the outer end provided with the platform 18 upwardly to cause the animal to slide within the receptacle 1. It will be noted that the horizontal floor or partition 11 divides the passage 5 into upper and lower portions or passages, and resting upon the said wall 11 is a second tiltable floor 19, the same being pivoted between the walls 4' to the rear of the bait box 14, as indicated by the numeral 20, and the portion of the floor resting upon the partition 11 being weighted, so that the opposite end of the said floor normally contacts with the lower angular portion 21 of the wall 8. The floor 19 is disposed a suitable distance below the bait box 9, and an animal traveling upon the said floor will be precipitated to within the trap, before the said animal reaches the bait box, as the weight of the animal will tilt the inner end of the floor 19, as will readily be understood.

The top as well as the bottom and ends of the casing are flanged to provide open sides, and bearing against all of said flanges and closing the said sides are plates of transparent material 22, the said plates being inserted between the side flanges of the top and the flanges 6 of the walls 4. The lower or bottom wall of the trap to the opposite sides thereof are provided with upstanding longitudinally disposed plates or flanges 23 which are arranged opposite the outer flanges of the bottom, the said flanges 23 contacting with the inner faces of the transparent plates 22 and so sustaining the said plates upon the trap. Secured to each of the flanges 23, is a bait box 24, the said box having its open face bearing against one of the plates 22, so that the said plate forms a closure for the box, and also the plate provides means whereby the contents of the box is visible.

To serve as a closure for the open end of the reduced portion 2 of the trap, I provide a plate 25 which is of a size sufficient to snugly engage between the walls of the said end, and the said plate has both its upper and lower transverse edges bent to provide eyes or barrels, the said barrels being indicated by the numerals 26 and 27 respectively and having preferably secured therein a pivot rod 28 which passes through suitable openings in the upper portion of the sides of the trap, while the lower portion of the sides of the trap are provided with openings 29 which are adapted to register with the bore of the barrel 27 and to receive a removable rod 30 which normally secures the pivoted plate 25 to the trap. The plate 25 is provided with a central reduced opening providing a passage 31. Secured in any desirable or preferred manner to the inner face of the plate and arranged flush with the edges of the plate providing the passage 31 are the side walls 32 of a hallway. The numeral 32 designates the top or connecting plate for the sides 33, and by reference to Figs. 3 and 5 of the drawings it will be noted that the said plate 32 is rounded downwardly, the purpose of which arrangement will presently be understood. The lower end of the passage is closed through the medium of an angular partition 34, while pivotally secured within the passage above the said partition, as at 35, is a curved floor 36 which has its outer end formed with an enlarged platform 37, the said platform weighting the floor 26 to cause the same to abut with the rounded wall 32 of the passage 31. By such an arrangement it will be noted that an animal traveling upon the floor 36, in an attempt to secure the bait within the trap, will tilt the said floor and be directed within the trap. It is to be noted that the weighted end or platform 37 of the floor 36 will at all times tilt the said floor upon its pivot causing its curved end to contact with the curved wall 32 of the passageway 31. Further, it will be noted that by removing the pivot 30, the plate or end 25 may be swung to an open position, as illustrated in Fig. 5 of the drawing and the captured animal thus removed from the trap.

Having thus described the invention, what I claim is:

1. A trap of the class described having an open end, a plate pivotally connected with the trap and closing the said end, removable means for locking the plate upon the trap, said plate having a rearwardly extending walled passage, the top of which is rounded downwardly and terminates with the lower edges of the sides of the passage, a floor pivoted between the side walls of the passages and having its outer end weighted to swing its inner edge into contact with the rounded transverse wall of the passage.

2. A trap for the purpose set forth having an open end, a plate pivotally connected with the end for closing the same, a lock rod for securing the plate upon the trap, said plate having a central opening, and a gravity door normally closing the opening.

In testimony whereof I affix my signature in presence of two witnesses.

CHARLES BOWLING.

Witnesses:
JAMES J. MAHONEY,
JOHN E. AMBROSE.

Copies of this patent may be obtained for five cents each, by addressing the "Commissioner of Patents, Washington, D. C."